US008923706B2

(12) United States Patent
Sethumadhavan et al.

(10) Patent No.: US 8,923,706 B2
(45) Date of Patent: Dec. 30, 2014

(54) FREQUENCY EQUALIZATION FOR AN OPTICAL TRANSMITTER

(75) Inventors: Chandrasekhar Sethumadhavan, Matawan, NJ (US); Xiang Liu, Marlboro, NJ (US); Peter J. Winzer, Aberdeen, NJ (US); Andrew Chraplyvy, Matawan, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 179 days.

(21) Appl. No.: 13/556,635

(22) Filed: Jul. 24, 2012

(65) Prior Publication Data

US 2014/0029957 A1 Jan. 30, 2014

(51) Int. Cl.
*H04B 10/04* (2006.01)
*H04B 10/12* (2006.01)

(52) U.S. Cl.
USPC ............................ 398/193; 398/192; 398/194

(58) Field of Classification Search
USPC .................. 398/182–184, 192–193
See application file for complete search history.

(56) References Cited

U.S. PATENT DOCUMENTS

| | | | |
|---|---|---|---|
| 7,903,772 B2 | 3/2011 | Jensen | |
| 2004/0141548 A1* | 7/2004 | Shattil | 375/146 |
| 2004/0223768 A1 | 11/2004 | Shastri et al. | |
| 2005/0080831 A1* | 4/2005 | Pickerd et al. | 708/300 |
| 2007/0206898 A1 | 9/2007 | Wang et al. | |
| 2009/0162066 A1* | 6/2009 | Ji et al. | 398/79 |
| 2009/0201796 A1 | 8/2009 | Roberts et al. | |
| 2009/0315626 A1* | 12/2009 | Bowler et al. | 330/304 |
| 2010/0158515 A1* | 6/2010 | Watanabe et al. | 398/25 |
| 2010/0202785 A1* | 8/2010 | Kawanishi et al. | 398/185 |
| 2011/0097085 A1* | 4/2011 | Oda et al. | 398/65 |
| 2012/0263481 A1* | 10/2012 | Ip et al. | 398/193 |
| 2013/0195455 A1* | 8/2013 | Jansen et al. | 398/65 |

FOREIGN PATENT DOCUMENTS

| | | |
|---|---|---|
| EP | 2464038 A1 | 6/2012 |
| WO | WO2010044814 A1 | 4/2010 |

OTHER PUBLICATIONS

International Search Report and Written Opinion; Mailed Oct. 30, 2013 for the corresponding PCT Application No. PCT/US2013/051569.
Jalali B., et al., "Adaptive CMOS Predistortion Linearizer for Fiber-Optic Links," Journal of Lightwave Technology, IEEE Service Center, New York, NY, vol. 21, No. 12, Dec. 1, 2003, pp. 3180-3193.
Barris, D., et al., "Optical Modulator Optimization for Orthogonal Frequency-Division Multiplexing," Journal of Lightwave Technology, IEEE Service Center, New York, NY, vol. 27, No. 13, Jul. 1, 2009, pp. 2370-2378.

(Continued)

*Primary Examiner* — David Payne
*Assistant Examiner* — Casey Kretzer
(74) *Attorney, Agent, or Firm* — Mendelsohn, Drucker & Dunleavy, P.C.; Yuri Gruzdkov; Steve Mendelsohn

(57) ABSTRACT

An optical transmitter configured to perform digital signal equalization directed at mitigating the detrimental effects of a frequency roll-off in the transmitter's optical I-Q modulator. In various embodiments, a frequency-dependent spectral-correction function used for the digital signal equalization can be constructed to cause the spectrum of the modulated optical signal generated by the transmitter to have a desired degree of flatness in the vicinity of an optical carrier frequency and/or to at least partially mirror the frequency roll-off in the optical I-Q modulator.

20 Claims, 5 Drawing Sheets

(56) References Cited

OTHER PUBLICATIONS

Cartledge, John C. et al., "Pulse Shaping for 112 Gbit/s Polarization Multiplexed 16-QAM Signals Using a 21 GSa/s DAC," Optics Express, Dec. 12, 2011, vol. 19, No. 26, pp. 628-635.

Gopalakrishnan, Ganesh K. et al., "Performance and Modeling of Resonantly Enhanced LiNbO3 Modulators for Low-Loss Analog Fiber-optic Links," IEEE Transactions on Microwave Theory and Techniques, vol. 42, No. 12, Dec. 1994, pp. 2650-2656.

Zhou, Xiang et al., "64-Tb/s, 8 b/s/Hz, PDM-36QAM Transmission Over 320 km Using Both Pre- and Post-Transmission Digital Signal Processing," Journal of Lightwave Technology, vol. 29, No. 4, Feb. 15, 2011, pp. 571-577.

Inan, Beril et al., "Real-Time 93.8-Gb/s Polarization-Multiplexed OFDM Transmitter with 1024-Point IFFT," Optics Express (2011) vol. 19 No. 26, pp. B64-B68.

* cited by examiner

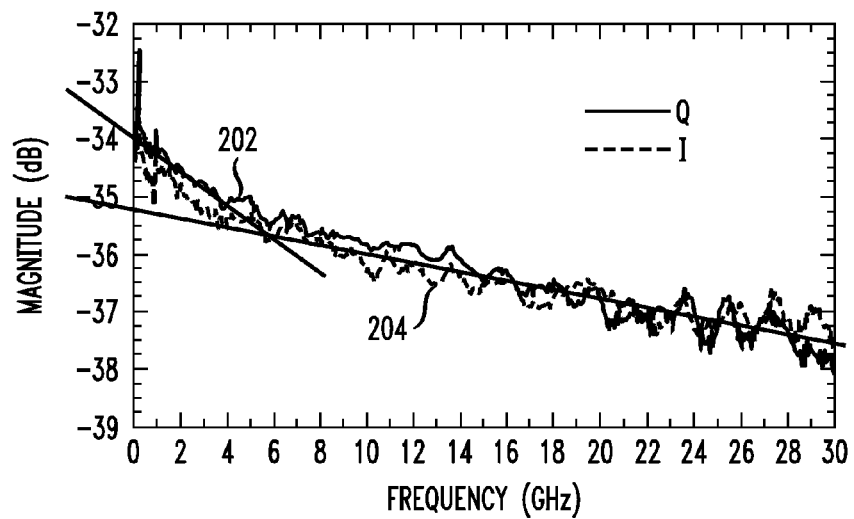

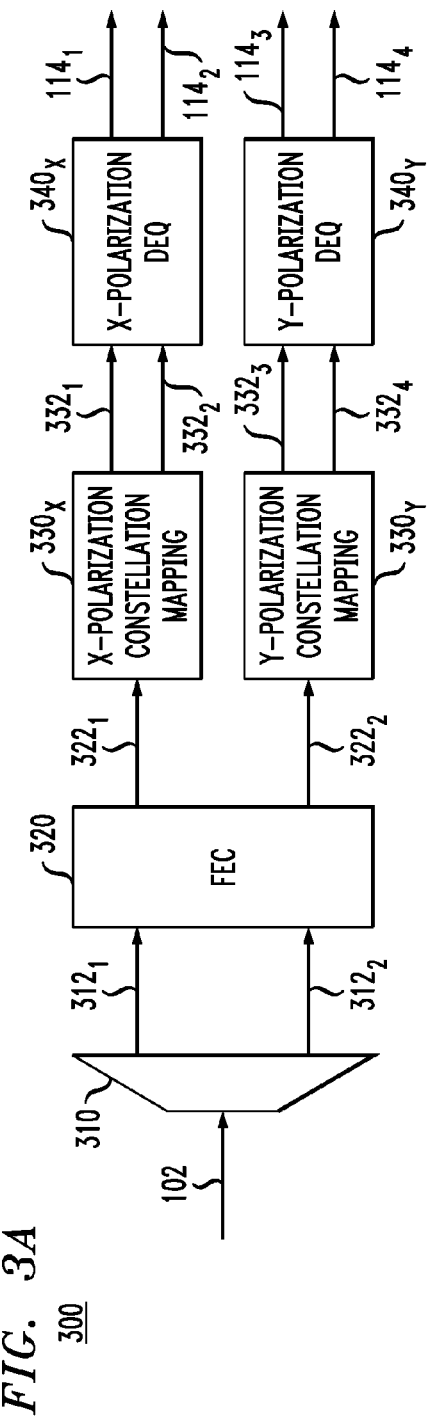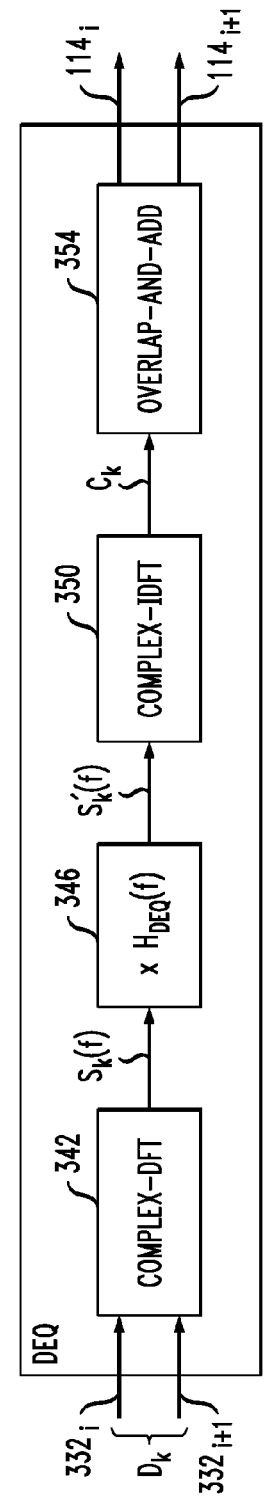

FREQUENCY EQUALIZATION FOR AN OPTICAL TRANSMITTER

BACKGROUND

1. Field

The present invention relates to optical communication equipment and, more specifically but not exclusively, to frequency equalization for an optical transmitter.

2. Description of the Related Art

This section introduces aspects that may help facilitate a better understanding of the invention(s). Accordingly, the statements of this section are to be read in this light and are not to be understood as admissions about what is in the prior art or what is not in the prior art.

Optical transmitters are critical elements within the present-day communications infrastructure. A continued trend in the development of optical transmitters is towards higher data-transmission rates. However, the use of relatively high data-transmission rates tends to exacerbate to a significant degree the performance penalty caused by non-optimal frequency characteristics of certain constituent components of the optical transmitter.

SUMMARY

Disclosed herein are various embodiments of an optical transmitter configured to perform digital signal equalization directed at mitigating the detrimental effects of a frequency roll-off in the transmitter's optical I-Q modulator. In various embodiments, a frequency-dependent spectral-correction function used for the digital signal equalization can be constructed to cause the spectrum of the modulated optical signal generated by the transmitter to have a desired degree of flatness in the vicinity of an optical carrier frequency and/or to at least partially minor the frequency roll-off in the optical I-Q modulator.

According to one embodiment, provided is an apparatus comprising: a front-end circuit configured to convert one or more electrical digital signals into a modulated optical signal having a first carrier frequency and a modulation symbol rate; and a digital signal processor configured to generate said one or more digital signals based on an input data stream and using a frequency-dependent spectral-correction function in a manner that causes the modulated optical signal to have a spectrum whose intensity variation is no greater than about 3 dB across a spectral range that is centered on the first carrier frequency and has a width of about the modulation symbol rate.

In some embodiments of the above apparatus, the digital signal processor is configured to generate said one or more digital signals in a manner that causes the spectrum of the modulated optical signal to have an intensity variation across said spectral range of no greater than about 2 dB or no greater than about 0.5 dB.

In some embodiments of any of the above apparatus, the digital signal processor is configured to: apply constellation mapping to a first data stream corresponding to the input data stream to generate a first stream of constellation symbols; and apply frequency-dependent spectral correction to the first stream of constellation symbols to generate a first digital signal and a second digital signal, wherein: the first digital signal has digital values representing in-phase components of the constellation symbols in the first stream of constellation symbols; and the second digital signal has digital values representing quadrature components of the constellation symbols in the first stream of constellation symbols.

In some embodiments of any of the above apparatus, the digital signal processor is further configured to: partition the first stream of constellation symbols into a plurality of segments; apply discrete Fourier transformation to said segments to generate a corresponding plurality of discrete spectra; convolve said discrete spectra with the frequency-dependent spectral-correction function to generate a corresponding plurality of corrected discrete spectra; apply inverse discrete Fourier transformation to said corrected discrete spectra to generate a corresponding plurality of sequences of corrected constellation symbols; and apply overlap-and-add processing to said plurality of the sequences to generate the first and second digital signals.

In some embodiments of any of the above apparatus, to apply the overlap-and-add processing to said plurality of the sequences, the digital signal processor is configured to: truncate the sequences to remove time overlap between them; and concatenate resulting truncated sequences to generate the first and second digital signals.

In some embodiments of any of the above apparatus, the digital signal processor is further configured to: apply constellation mapping to a second data stream corresponding to the input data stream to generate a second stream of constellation symbols; apply frequency-dependent spectral correction to the second stream of constellation symbols to generate a third digital signal and a fourth digital signal, wherein: the third digital signal has digital values representing in-phase components of the constellation symbols in the second data stream of constellation symbols; and the fourth digital signal has digital values representing quadrature components of the constellation symbols in the second stream of constellation symbols; and the front-end circuit is configured to: convert the first and second digital signals into a first polarization component of the modulated optical signal; and convert the third and fourth digital signals into a second polarization component of the modulated optical signal orthogonal to the first polarization component.

In some embodiments of any of the above apparatus, a squared absolute value of the frequency-dependent spectral-correction function is represented by a first line segment having a first slope and a second line segment having a second slope different from the first slope, said first and second line segments being connected to one another at a frequency that is smaller than about one quarter of the modulation symbol rate.

In some embodiments of any of the above apparatus, the frequency at which said first and second line segments are connected to one another is smaller than about 6 GHz.

In some embodiments of any of the above apparatus, the frequency-dependent spectral-correction function is further represented by a third line segment connected to the second line segment, said third line segment having a third slope different from the first slope and the second slope.

In some embodiments of any of the above apparatus, the third slope is substantially zero.

In some embodiments of any of the above apparatus, the third slope has substantially the same absolute value as the first slope, but an opposite sign.

In some embodiments of any of the above apparatus, the first line segment is located at lower frequencies than the second line segment; and the first slope is greater than the second slope.

In some embodiments of any of the above apparatus, the front-end circuit comprises a Mach-Zehnder modulator having a frequency-dependent signal-transfer characteristic; and the frequency-dependent spectral-correction function is based on said frequency-dependent signal-transfer characteristic.

In some embodiments of any of the above apparatus, the front-end circuit is further configured to convert the one or more digital signals into a second modulated optical signal having a second carrier frequency different from the first carrier frequency; and the frequency-dependent spectral-correction function further includes an additional component to perform pulse shaping based on raised-cosine filtering.

According to another embodiment, provided is an apparatus comprising a front-end circuit configured to convert one or more electrical digital signals into a modulated optical signal having a modulation symbol rate; and a digital signal processor configured to generate said one or more digital signals based on an input data stream and using a frequency-dependent spectral-correction function whose squared absolute value is represented by a first line segment having a first slope and a second line segment having a second slope different from the first slope, said first and second line segments being connected to one another at a frequency that is smaller than about one half of the modulation symbol rate.

According to yet another embodiment, provided is a method of generating a modulated optical signal comprising the steps of: converting one or more electrical digital signals into the modulated optical signal using a modulation symbol rate; and generating said one or more electrical digital signals based on an input data stream and using a frequency-dependent spectral-correction function whose squared absolute value is represented by a first line segment having a first slope and a second line segment having a second slope different from the first slope, said first and second line segments being connected to one another at a frequency that is smaller than about one half of the modulation symbol rate.

BRIEF DESCRIPTION OF THE DRAWINGS

Other aspects, features, and benefits of various embodiments of the invention will become more fully apparent, by way of example, from the following detailed description and the accompanying drawings, in which:

FIGS. 2A-2B graphically illustrate certain frequency characteristics of a representative embodiment of the optical transmitter shown in FIG. 1;

FIGS. 3A-3B show block diagrams of a digital signal processor that can be used in the transmitter shown in FIG. 1 according to one embodiment of the disclosure;

DETAILED DESCRIPTION

Figure 1:
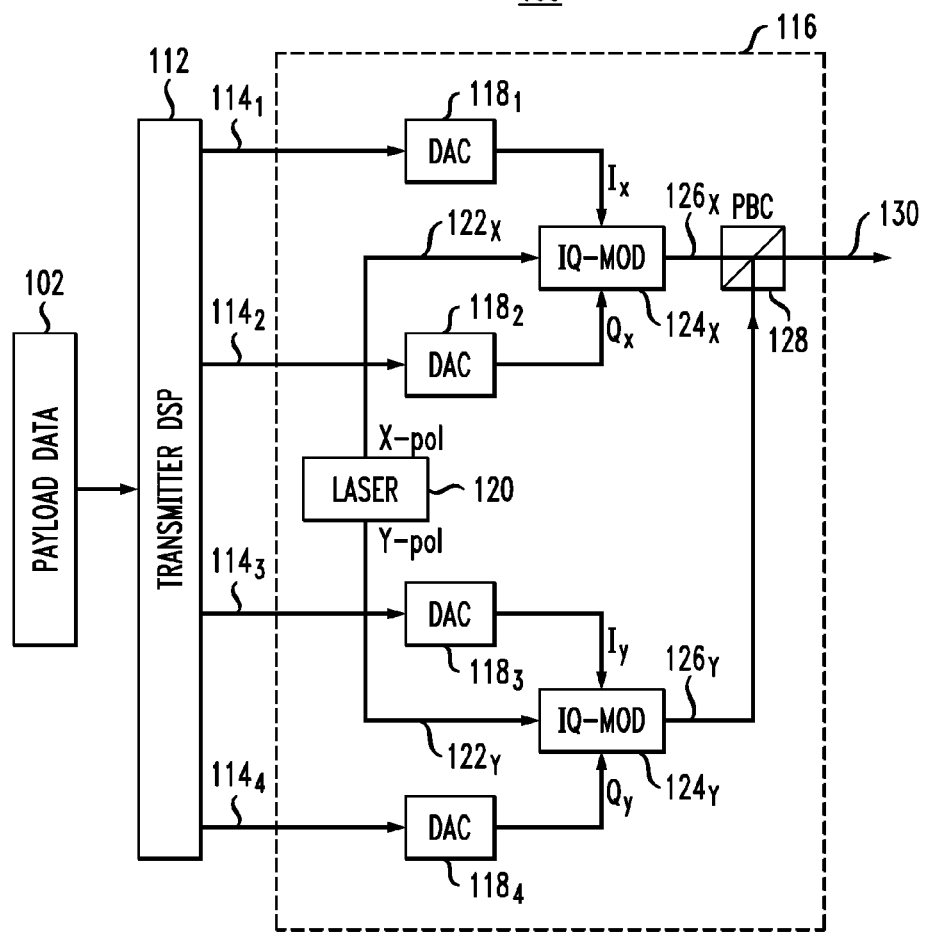
FIG. 1 shows a block diagram of an optical transmitter according to one embodiment of the disclosure.

FIG. 1 shows a block diagram of an optical transmitter 100 according to one embodiment of the disclosure. Transmitter 100 is configured to (i) modulate light using constellation symbols and (ii) apply a resulting modulated optical output signal 130 to an optical transport link for transmission to a remote optical receiver (not explicitly shown in FIG. 1). Both transmitter 100 and the remote receiver rely on the same selected constellation (such as a quadrature-amplitude-modulation (QAM) constellation or a quadrature-phase-shift-keying (QPSK) constellation) in the processes of generating signal 130 and decoding the corresponding received optical signal at the remote end of the optical transport link, respectively.

Transmitter 100 receives a digital (electrical) input stream 102 of payload data and applies it to a digital signal processor (DSP) 112. DSP 112 processes input stream 102 to generate electrical digital signals $114_1$-$114_4$. Such processing may include, but is not limited to forward-error-correction (FEC) encoding, constellation mapping, and digital frequency equalization, e.g., implemented as further described below in reference to FIG. 3. In each signaling interval (also referred to as a time slot corresponding to an optical symbol or a symbol period), signals $114_1$ and $114_2$ carry digital values that represent the in-phase (I) component and quadrature (Q) component, respectively, of a corresponding constellation point (symbol) intended for transmission using X-polarized light. Signals $114_3$ and $114_4$ similarly carry digital values that represent the I and Q components, respectively, of the corresponding constellation point intended for transmission using Y-polarized light, where the Y-polarization is approximately orthogonal to the X-polarization.

An electrical-to-optical (E/O) converter (also sometimes referred to as a front-end circuit) 116 of transmitter 100 transforms digital signals $114_1$-$114_4$ into modulated optical output signal 130. More specifically, digital-to-analog converters (DACs) $118_1$ and $118_2$ transform digital signals $114_1$ and $114_2$ into an analog form to generate drive signals $I_X$ and $Q_X$, respectively. Drive signals $I_X$ and $Q_X$ are then used, in a conventional manner, to drive an I-Q modulator $124_X$. Based on drive signals $I_X$ and $Q_X$, I-Q modulator $124_X$ modulates an X-polarized beam $122_X$ of light supplied by a laser source 120, thereby generating a modulated optical signal $126_X$.

DACs $118_3$ and $118_4$ similarly transform digital signals $114_3$ and $114_4$ into an analog form to generate drive signals $1_Y$ and $Q_Y$, respectively. Based on drive signals $1_Y$ and $Q_Y$, an I-Q modulator $124_Y$ modulates a Y-polarized beam $122_Y$ of light supplied by laser source 120, thereby generating a modulated optical signal $126_Y$.

A polarization beam combiner 128 combines modulated optical signals $126_X$ and $126_Y$ to generate optical output signal 130.

FIGS. 2A and 2B graphically illustrate certain frequency characteristics of a representative embodiment of transmitter 100. More specifically, the graphs shown in FIGS. 2A and 2B correspond to an embodiment of transmitter 100 in which each of I-Q modulators $124_X$ and $124_Y$ is implemented using a respective Mach-Zehnder modulator. FIG. 2A graphically shows a frequency response (signal-transfer function) of I-Q modulator 124. FIG. 2B graphically shows a representative spectrum of optical output signal 130 corresponding to the frequency response shown in FIG. 2A.

Referring first to FIG. 2A, curves 202 and 204 graphically show the frequency responses of I-Q modulator 124 corresponding to the input ports configured to receive drive signals I and Q, respectively. As can be seen in FIG. 2A, the two frequency responses are similar to one another and can be approximated well using two linear functions, as indicated by the two straight lines in FIG. 2A. More specifically, the first of the two linear functions approximates the frequency response of I-Q modulator 124 at frequencies that are smaller than about 6 GHz. The second of the two linear functions approximates the frequency response of I-Q modulator 124 at frequencies between about 6 GHz and 30 GHz. Note that the slope of the first linear function is significantly steeper than the slope of the second linear function.

The spectrum shown in FIG. 2B corresponds to optical carrier frequency $f_0$ and represents a single WDM channel of transmitter 100. The spectrum has three bands labeled 206, 208, and 210. Band 208 is located in the spectral region between frequency $f_0-B$ and $f_0+B$, where B is the modulation symbol rate used in transmitter 100. Bands 206 and 210 are modulation sidebands that flank band 208. In one embodiment, transmitter 100 may incorporate a passband filter (not explicitly shown in FIG. 1) configured to remove sidebands 206 and 210 from signal 130, e.g., to reduce crosstalk between spectrally adjacent WDM channels (if any).

Note that band 208 has a spectral hump 212 located near frequency $f_0$. Hump 212 is a manifestation of the relatively steep frequency roll-off that I-Q modulator 124 exhibits at relatively low frequencies (e.g., below about 6 GHz), as indicated in FIG. 2A. Based on the results reported in the paper by G. K. Gopalakrishnan, "Performance and Modeling of Resonantly Enhanced LiNbO$_3$ Modulators for Low-Loss Analog Fiber-Optic Links," IEEE Transactions on Microwave Theory and Techniques, 1994, v. 42, No. 12, pp. 2650-2656, hump 212 may be partially attributed to the impedance mismatch between the termination and the traveling wave electrodes in the Mach-Zehnder modulator. The teachings of this paper are incorporated herein by reference in their entirety. Since many different types of optical modulators are characterized by a similar mismatch, their frequency responses may have humps that are similar to hump 212. While the shapes and frequency widths of these humps may vary from modulator to modulator, one of ordinary skill in the art will appreciate that the spectral-correction functions disclosed below can be adapted, in a relatively straightforward manner, to correspond to specific actual frequency responses.

It can be shown that the presence of spectral hump 212 in the spectrum of signal 130 is detrimental to the performance of transmitter 100, for example, because it imposes a BER (bit error rate) penalty due to the deterioration of the effective optical signal-to-noise ratio (OSNR) in signal 130.

Some embodiments disclosed herein are directed at reducing the BER penalty caused generally by the above-described frequency roll-off in the transfer function of I-Q modulator 124 or its functional equivalents and, more particularly, by the relatively steep portion of the frequency roll-off located at relatively low frequencies.

FIGS. 3A-3B show block diagrams of a DSP 300 that can be used to implement DSP 112 (FIG. 1) according to one embodiment of the disclosure. More specifically, FIG. 3A shows an overall block diagram of DSP 300. FIG. 3B shows a block diagram of a digital-equalization (DEQ) module 340 used in DSP 300.

When used in transmitter 100, DSP 300 is configured to receive payload-data stream 102 and generate digital signals $114_1$-$114_4$ as indicated in FIG. 3A (also see FIG. 1). DSP 300 has a de-multiplexer 310 that de-multiplexes stream 102 to generate data streams $312_1$ and $312_2$. An FEC encoder 320 then adds redundancy to data streams $312_1$ and $312_2$, as known in the art, thereby transforming them into FEC-encoded data streams $322_1$ and $322_2$, respectively.

DSP 300 further has constellation-mapping modules $330_X$ and $330_Y$ configured to process FEC-encoded data streams $322_1$ and $322_2$, respectively. Using the operative (e.g., QAM or QPSK) constellation, constellation-mapping module $330_X$ transforms FEC-encoded data stream $322_1$ into a corresponding stream of constellation symbols, wherein each constellation symbol is represented by a complex value. In each time slot, digital signals $332_1$ and $332_2$ generated by constellation-mapping module $330_X$ carry the real part and the imaginary part, respectively, of the corresponding complex value. Constellation-mapping module $330_Y$ similarly transforms FEC-encoded data stream $322_2$ into a corresponding stream of constellation symbols, wherein each constellation symbol is represented by a complex value. In each time slot, digital signals $332_3$ and $332_4$ generated by constellation-mapping module $330_Y$ carry the real part and the imaginary part, respectively, of the corresponding complex value.

DSP 300 further has DEQ modules $340_X$ and $340_Y$ configured to transform digital signals $332_1$-$332_4$ into digital signals $114_1$-$114_4$. More specifically, DEQ module $340_X$ applies digital-equalization processing to digital signals $332_1$-$332_2$, thereby generating digital signals $114_1$-$114_2$. DEQ module $340_Y$ similarly applies digital-equalization processing to digital signals $332_3$-$332_4$, thereby generating digital signals $114_3$-$114_4$. Exemplary digital-equalization processing performed in each of DEQ modules $340_X$ and $340_Y$ is further described below in reference to FIG. 3B.

Referring now to FIG. 3B, DEQ module 340 has a discrete-Fourier-transform (DFT) sub-module 342 configured to apply a complex discrete Fourier transformation, in a segment-by-segment manner, to a sequence of complex values received from the corresponding one of constellation-mapping modules $330_X$ and $330_Y$ via digital signals $332_i$ and $332_{i+1}$, where i=1 or 3. More specifically, DEQ module 340 first partitions the received sequence into consecutive segments $D_k$ (where k is an integer index that is incremented by one from one segment to the next) and then sequentially applies a complex discrete Fourier transformation to each segment $D_k$. In a representative configuration, each segment $D_k$ may include, e.g., from 128 to 1024 complex values. The result of this discrete Fourier transformation is a complex discrete spectrum, $S_k(f)$. One skilled in the art will appreciate that the use of longer segments $D_k$ at the input of DFT sub-module 342 generally results in a higher spectral resolution for spectra $S_k(f)$, but requires more computational power to carry out the Fourier transformation. Therefore, the size of segments $D_k$ can be selected to strike an acceptable compromise between the desired spectral resolution and the required computational power.

DEQ module 340 further has a convolution sub-module 346 that receives spectrum $S_k(f)$ from DFT sub-module 342 and multiplies (or convolves) the received spectrum by (with) a discrete spectral-correction function, $H_{DEQ}(f)$. In one configuration, spectral-correction function $H_{DEQ}(f)$ may consist of real values. The spectral shape of spectral-correction function $H_{DEQ}(f)$ is selected, for example, so as to (i) reduce the detrimental effects of the frequency roll-off shown in FIG. 2A and (ii) apply appropriate band-pass filtering to reduce crosstalk between adjacent WDM channels (if any) in signal 130. The result of the multiplication (or convolution) performed by convolution sub-module 346 is a corrected complex discrete spectrum, $S_k'(f)$. Representative examples of spectral-correction function $H_{DEQ}(f)$ are described in more detail below in reference to FIGS. 4A and 4B.

An inverse-DFT sub-module 350 receives corrected complex discrete spectrum $S_k'(f)$ from convolution sub-module 346 and applies to it a complex inverse discrete Fourier transformation. The result of this inverse discrete Fourier transformation is a sequence of complex values or corrected constellation symbols, $C_k$. Due to the spectral filtering performed in convolution sub-module 346, each sequence $C_k$ is generally longer (e.g., has more complex values) than the corresponding segment $D_k$, which causes each of two consecutive sequences $C_k$, e.g., $C_{k0}$ and $C_{k0+1}$, to overlap with one another in time. An overlap-and-add sub-module 354 appropriately truncates each sequence $C_k$ to remove the time overlap and then concatenates the resulting truncated sequences to generate digital signals $114_i$ and $114_{i+1}$, where i=1 or 3. Digital signal $114_i$ carries the real parts of the complex values of the truncated sequences, and digital signal $114_{i+1}$ carries the imaginary parts of the complex values of the truncated sequences.

In one embodiment, DEQ module 340 can also be configured to perform certain forms of digital pulse shaping in addition to the above-described spectral correction. For example, DEQ module 340 can be configured to additionally perform raised-cosine pulse shaping. Representative implementations of a raised-cosine filter that can be used in DEQ module 340 are disclosed, e.g., in U.S. Pat. No. 7,903,772 and U.S. Patent Application Publication No. 2007/0206898, both of which are incorporated herein by reference in their entirety.

In an alternative embodiment, spectral-correction function $H_{DEQ}(f)$ can be constructed to incorporate an additional filter function for performing digital pulse shaping, such as raised-cosine filtering.

Figure 4A:
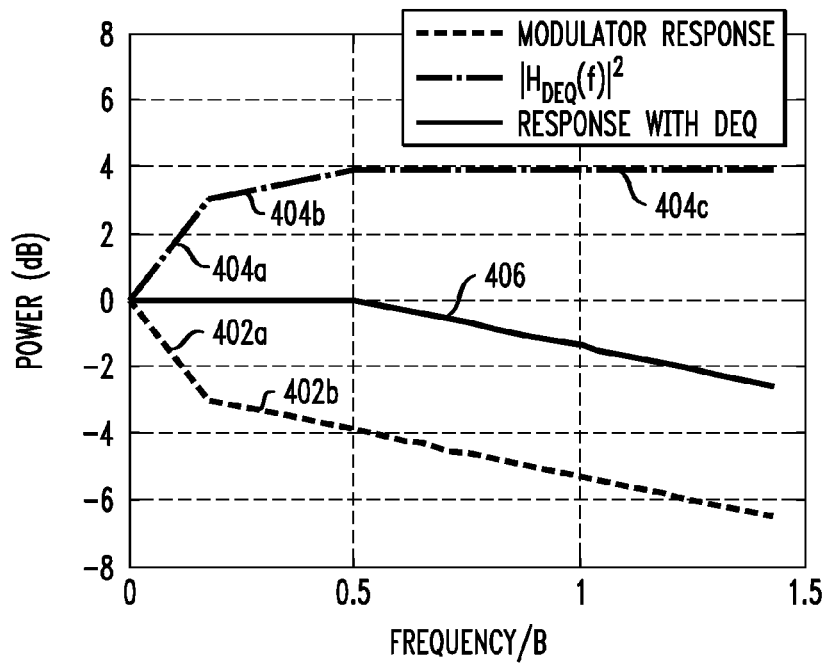
FIGS. 4A-4B graphically show two representative examples of a spectral-correction function that can be used in the digital signal processor shown in FIG. 3.

FIG. 4A graphically shows spectral-correction function $H_{DEQ}(f)$ that can be used in convolution sub-module 346 (FIG. 3) according to one embodiment of the disclosure. More specifically, curve 402 in FIG. 4A shows an approximate frequency response of front-end circuit 116 including I-Q modulator 124 (also see FIG. 2A). Curve 404 shows the squared absolute value of spectral-correction function $H_{DEQ}(f)$. Curve 406 shows an approximate effective frequency response of front-end circuit 116 when spectral-correction function 404 is used in DEQ module 340. Note that the abscissa in FIG. 4A shows the frequency in units of B, where B is the modulation symbol rate used in transmitter 100.

Curve 404 consists of three line segments labeled 404a, 404b, and 404c, respectively. Line segment 404c is flat and has an approximately zero slope. Line segments 404a and 404b mirror curve 402. More specifically, the slope of line segment 404a has approximately the same absolute value as the slope of line segment 402a of curve 402, but the signs of the slopes are different, with line segment 402a having a negative slope and line segment 404a having a positive slope. A similar relationship applies to line segments 402b and 404b: the slope of line segment 404b has approximately the same absolute value as the slope of line segment 402b, but the signs of the slopes are different, with the slopes of line segments 402b and 404b being negative and positive, respectively. Line segments 404a and 404b connect to one another at a frequency that is smaller than about one quarter of modulation symbol rate B. When B=28 GBaud, the connection point is located at a frequency that is smaller than about 6 GHz.

Inspection of curve 406 reveals that the effective frequency response of front-end circuit 116 is approximately flat within the frequency range between about zero and about B/2. At frequencies higher than about B/2, the effective frequency response rolls off at about the same rate as the uncorrected frequency response indicated by curve 402.

Figure 4B:
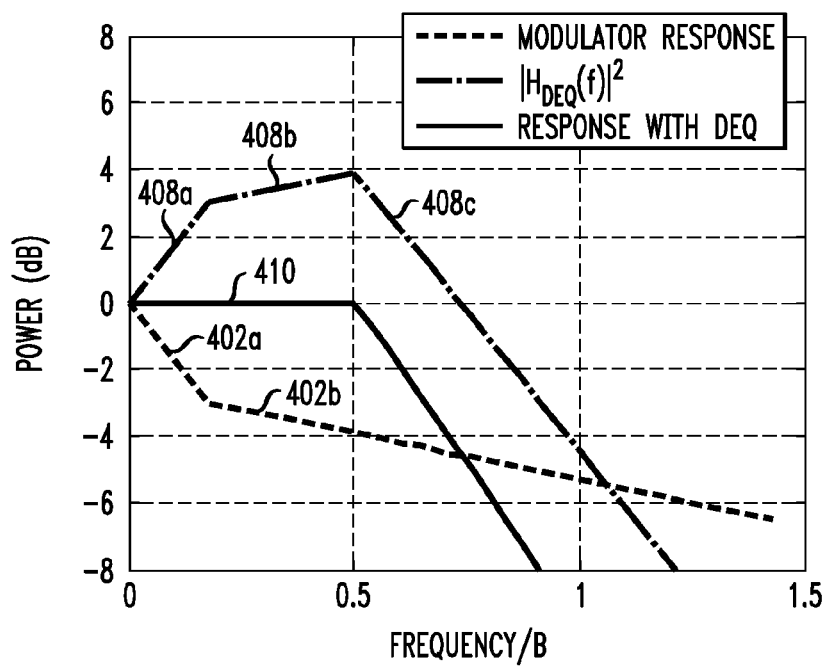

FIG. 4B graphically shows spectral-correction function $H_{DEQ}(f)$ that can be used in convolution sub-module 346 (FIG. 3) according to another embodiment of the disclosure. Curve 402 in FIG. 4B is the same as curve 402 in FIG. 4A. Curve 408 shows the squared absolute value of spectral-correction function $H_{DEQ}(f)$. Curve 410 shows an approximate effective frequency response of front-end circuit 116 when spectral-correction function 408 is used in DEQ module 340. The frequency scale used on the abscissa of FIG. 4B is in units of B.

Curve 408 consists of three line segments labeled 408a, 408b, and 408c, respectively. Line segment 408a is analogous to line segment 404a (FIG. 4A). Line segment 408b is analogous to line segment 404b (FIG. 4A). Line segment 408c has approximately the same slope as line segment 402a and its parameters are selected in this manner (i) for relative ease of implementation in a DSP and/or (ii) to band-limit signal 130 in order to reduce crosstalk between adjacent WDM channels (if any) in signal 130.

Inspection of curve 410 reveals that the effective frequency response of front-end circuit 116 is approximately flat within the frequency range between about zero and about B/2. At frequencies higher than about B/2, the effective frequency response rolls off relatively steeply, thereby band-limiting signal 130.

One of ordinary skill in the art will appreciate that the spectral-correction functions shown in FIGS. 4A and 4B are but two representative examples of many other possible spectral-correction functions that can be used in convolution sub-module 346 (FIG. 3). In particular, the following general principles can be used as guidance for constructing spectral-correction function $H_{DEQ}(f)$. For the portion of the spectral-correction function located at frequencies lower than about B/2, its spectral shape is selected so as to flatten, to a selected degree of flatness, the spectrum of signal 130 within the spectral range from about $f_0-B/2$ to about $f_0+B/2$. For the portion of the spectral-correction function located at frequencies higher than about B/2, its spectral shape is selected so as to provide a desired degree of spectral confinement/sideband suppression to the WDM channel corresponding to carrier frequency $f_0$.

One of ordinary skill in the art will further appreciate that the positions and/or widths of the various portions of spectral-correction function $H_{DEQ}(f)$ may not be necessarily tied to the modulation symbol rate, but instead can be defined in terms of the absolute frequency or a frequency offset with respect to $f_0$, e.g., measured in Hz.

Figure 5A:
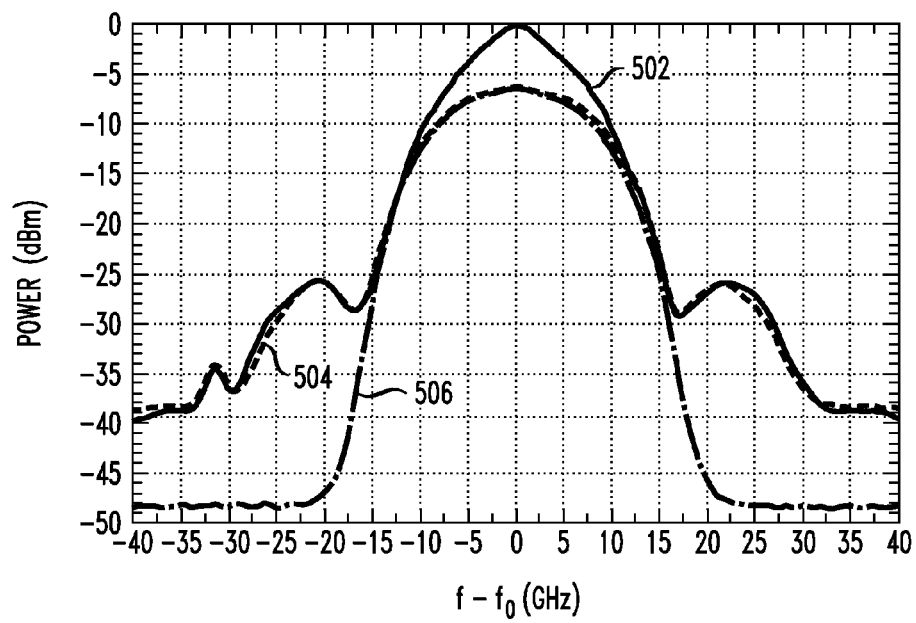
FIGS. 5A-5B graphically show experimentally measured spectra of the optical output signal generated by the transmitter shown in FIG. 1 in its different configurations.
Figure 5B:
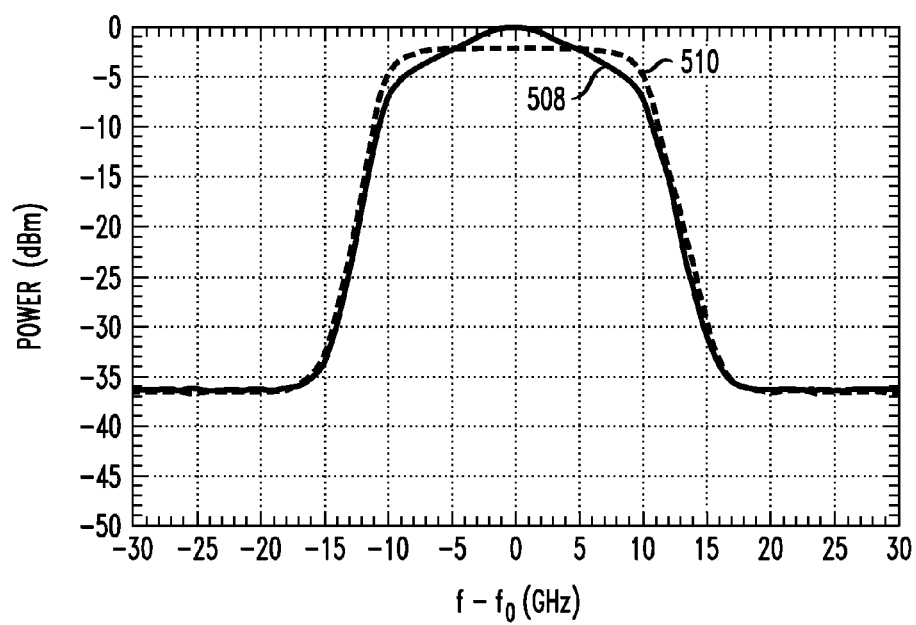

FIGS. 5A and 5B graphically show experimentally measured spectra of signal 130 corresponding to different configurations of transmitter 100. More specifically, the spectra shown in FIG. 5A correspond to a configuration in which transmitter 100 generates a single-carrier 16-Gbaud (B=16 GHz) polarization-division-multiplexed quadrature-phase-shift-keying (PDM-QPSK) signal 130. The spectra shown in FIG. 5B correspond to a configuration in which transmitter 100 generates a 20-Gbaud (B=20 GHz) PDM-QPSK orthogonal-frequency-division-multiplexing (OFDM) signal 130.

Referring to FIG. 5A, curve 502 shows a spectrum of signal 130 when the DEQ processing is turned OFF. Curve 504 shows a spectrum of signal 130 when the DEQ processing is turned ON and the applied spectral-correction function $H_{DEQ}(f)$ is similar to that shown by curve 404 in FIG. 4A. Curve 506 shows a spectrum of signal 130 when the DEQ processing is turned ON and the applied spectral-correction function $H_{DEQ}(f)$ is similar to that shown by curve 408 in FIG. 4B.

In the spectral range between about −8 GHz and +8 GHz, spectrum 502 has an intensity variation of about 8 dB. In contrast, in the same spectral range, each of spectra 504 and 506 has an intensity variation of only about 3 dB. In addition, spectrum 506 does not have modulation sidebands, which are substantially fully suppressed due to the DEQ processing in DSP 112.

Referring now to FIG. 5B, curve 508 shows a spectrum of signal 130 when the DEQ processing is turned OFF, but the signal is filtered, using a passband filter (not explicitly shown in FIG. 1), to remove the modulation sidebands. Curve 510 shows a spectrum of signal 130 when the DEQ processing is turned ON and the signal is filtered, using the passband filter, to remove the modulation sidebands. In the spectral range between about −10 GHz and +10 GHz, spectrum 508 has an intensity variation of about 7 dB. In contrast, in the same spectral range, spectrum 510 has an intensity variation of only about 2 dB.

As already indicated above, having a relatively flat spectral profile in the spectral range from about $f_0-B/2$ to about $f_0+B/2$ is advantageous, e.g., because it improves the effective OSNR and/or the effective baseline $Q^2$-performance. For example, the data shown in FIGS. 5A and 5B indicate an effective OSNR improvement between about 0.5 dB and about 1 dB at a BER of $10^{-3}$. The data also indicate the effective baseline $Q^2$-performance improvement between about 1 dB and about 1.5 dB. In addition, we observe that, without the DEQ processing in transmitter 100, an autocorrelation-based OFDM synchronization procedure fails to work in an automated manner at the remote receiver of signal 130.

Advantages and benefits of various embodiments disclosed herein become especially apparent by way of comparing the results shown in FIGS. 5A-5B with the results reported in the literature, where the detrimental effects of humps analogous to hump 212 (FIG. 2B) were not realized and/or were not addressed. Representative publications that illustrate this point are: (1) J. Cartledge et al., "Pulse Shaping for 112 Gbit/s Polarization Multiplexed 16-QAM Signals Using a 21 GSa/s DAC," Optics Express 19(26), B628-B635 (2011), and (2) B. Inan et al., "Real-Time 93.8-Gb/s Polarization-Multiplexed OFDM Transmitter with 1024-Point IFFT," Optics Express 19(26), B64-B68 (2011), both of which are incorporated herein by reference in their entirety.

While this invention has been described with reference to illustrative embodiments, this description is not intended to be construed in a limiting sense.

Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation." Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

What is claimed is:

1. An apparatus, comprising:
a front-end circuit configured to convert one or more electrical digital signals into a modulated optical signal having a first carrier frequency and a modulation symbol rate; and
a digital signal processor configured to generate said one or more electrical digital signals based on an input data stream and use of a frequency-dependent spectral-correction function in a manner that causes the modulated optical signal to have a spectrum whose intensity variation is no greater than about 3 dB across a spectral range that is centered on the first carrier frequency and has a width of the modulation symbol rate, wherein:
the front-end circuit comprises a Mach-Zehnder modulator having a frequency-dependent signal-transfer characteristic; and the frequency-dependent spectral-correction function is based on said frequency-dependent signal-transfer characteristic.

2. The apparatus of claim 1, wherein the digital signal processor is configured to generate said one or more electrical digital signals in a manner that causes the spectrum of the modulated optical signal to have an intensity variation across said spectral range of no greater than 2 dB or no greater than 0.5 dB.

3. The apparatus of claim 1, wherein the digital signal processor is configured to:
apply constellation mapping to a first data stream corresponding to the input data stream to generate a first stream of constellation symbols; and
apply frequency-dependent spectral correction to the first stream of constellation symbols to generate a first electrical digital signal and a second electrical digital signal, wherein:
the first electrical digital signal has digital values representing in-phase components of the constellation symbols in the first stream constellation symbols; and
the second electrical digital signal has digital values representing quadrature components of the constellation symbols in the first stream of constellation symbols.

4. The apparatus of claim 3, wherein the digital signal processor is further configured to:
partition the first stream of constellation symbols into a plurality of segments;
apply discrete Fourier transformation to said segments to generate a corresponding plurality of discrete spectra;
convolve said discrete spectra with the frequency-dependent spectral-correction function to generate a corresponding plurality of corrected discrete spectra;
apply inverse discrete Fourier transformation to said corrected discrete spectra to generate a corresponding plurality of sequences of corrected constellation symbols; and
apply overlap-and-add processing to said plurality of the sequences to generate the first and second electrical digital signals.

5. The apparatus of claim 4, wherein, to apply the overlap-and-add processing to said plurality of the sequences, the digital signal processor is configured to:
truncate the sequences to remove time overlap between them; and
concatenate resulting truncated sequences to generate the first and second electrical digital signals.

6. The apparatus of claim 3, wherein:
the digital signal processor is further configured to:
apply constellation mapping to a second data stream corresponding to the input data stream to generate a second stream of constellation symbols;
apply frequency-dependent spectral correction to the second stream of constellation symbols to generate a third electrical digital signal and a fourth electrical digital signal, wherein:
the third electrical digital signal has digital values representing in-phase components of the constellation symbols in the second data stream of constellation symbols; and
the fourth electrical digital signal has digital values representing quadrature components of the constellation symbols in the second stream of constellation symbols; and the front-end circuit is configured to:
convert the first and second electrical digital signals into a first polarization component of the modulated optical signal; and
convert the third and fourth electrical digital signals into a second polarization component of the modulated optical signal orthogonal to the first polarization component.

7. The apparatus of claim 1, wherein a squared absolute value of the frequency-dependent spectral-correction function is represented by a first line segment having a first slope and a second line segment having a second slope different from the first slope, said first and second line segments being connected to one another at a frequency that is smaller than 6 GHz.

8. The apparatus of claim 1, wherein a squared absolute value of the frequency-dependent spectral-correction function is represented by a first line segment having a first slope and a second line segment having a second slope different from the first slope, said first and second line segments being connected to one another at a frequency that is smaller than one quarter of the modulation symbol rate.

9. The apparatus of claim 7, wherein the squared absolute value of the frequency-dependent spectral-correction function is further represented by a third line segment connected to the second line segment, said third line segment having a third slope different from the first slope and the second slope.

10. The apparatus of claim 9, wherein the third slope is substantially zero.

11. The apparatus of claim 9, wherein the third slope has substantially the same absolute value as the first slope, but an opposite sign.

12. The apparatus of claim 8, wherein:
the first line segment is located at lower frequencies than the second line segment; and
the first slope is greater than the second slope.

13. The apparatus of claim 1, wherein the frequency-dependent spectral-correction function is configured to at least partially compensate a frequency roll-off caused by said frequency-dependent signal-transfer characteristic in a manner that causes said spectrum within said spectral range to be flatter than a corresponding spectrum without the use of the frequency-dependent spectral-correction function.

14. The apparatus of claim 1, wherein:
the front-end circuit is further configured to convert said one or more electrical digital signals into a second modulated optical signal having a second carrier frequency different from the first carrier frequency; and
the frequency-dependent spectral-correction function further includes an additional component to perform pulse shaping based on raised-cosine filtering.

15. An apparatus, comprising:
a front-end circuit configured to convert one or more electrical digital signals into a modulated optical signal having a modulation symbol rate; and
a digital signal processor configured to generate said one or more electrical digital signals based on an input data stream and application of a frequency-dependent spectral-correction function whose squared absolute value is represented by a first line segment having a first slope and a second line segment having a second slope different from the first slope, said first and second line segments being connected to one another at a frequency that is smaller than one half of the modulation symbol rate, wherein:

the front-end circuit comprises a Mach-Zehnder modulator having a frequency-dependent signal-transfer characteristic; and the frequency-dependent spectral-correction function is based on said frequency-dependent signal-transfer characteristic.

16. The apparatus of claim 15, wherein the frequency at which said first and second line segments are connected to one another is smaller than quarter of the modulation symbol rate or smaller than 6 GHz.

17. The apparatus of claim 15, wherein the squared absolute value of the frequency-dependent spectral-correction function is further represented by a third line segment connected to the second line segment, said third line segment having a third slope different from the first slope and the second slope.

18. The apparatus of claim 17, wherein the third slope the third slope has substantially the same absolute value as the first slope, but an opposite sign.

19. The apparatus of claim 15, wherein:
the first line segment is located at lower frequencies than the second line segment; and
the first slope is greater than the second slope.

20. An apparatus, comprising:
a front-end circuit configured to convert one or more electrical digital signals into a modulated optical signal having a first carrier frequency and a modulation symbol rate; and a digital signal processor configured to generate said one or more electrical digital signals based on an input data stream and use of a frequency-dependent spectral-correction function in a manner that causes the modulated optical signal to have a spectrum whose intensity variation is no greater than about 3 dB across a spectral range that is centered on the first carrier frequency and has a width of the modulation symbol rate;

wherein a squared absolute value of the frequency-dependent spectral-correction function is represented by a first line segment having a first slope and a second line segment having a second slope different from the first slope, said first and second line segments being connected to one another at a frequency that is smaller than one quarter of the modulation symbol rate;

wherein the squared absolute value of the frequency-dependent spectral-correction function is further represented by a third line segment connected to the second line segment, said third line segment having a third slope different from the first slope and the second slope; and wherein the third slope is substantially zero.

* * * * *